(12) United States Patent  (10) Patent No.: US 8,560,415 B2
Acuña-Rohter et al.  (45) Date of Patent: Oct. 15, 2013

(54) SMART TRADE TEMPLATE BASED MATCHING

(75) Inventors: José Antonio Acuña-Rohter, Park Ridge, IL (US); Pearce Peck-Walden, Chicago, IL (US); Dileep Konduru, Schaumburg, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 195 days.

(21) Appl. No.: 12/883,925

(22) Filed: Sep. 16, 2010

(65) Prior Publication Data

US 2012/0072326 A1   Mar. 22, 2012

(51) Int. Cl.
*G06Q 40/00*   (2012.01)

(52) U.S. Cl.
USPC ................. 705/35; 705/36 R; 705/37

(58) Field of Classification Search
USPC ..................................... 705/35–45
See application file for complete search history.

(56) References Cited

U.S. PATENT DOCUMENTS 7,805,360 B2 *   9/2010   Sundaram et al. .............. 705/37
8,249,977 B2 *   8/2012   Kontos et al. .................. 705/37
2004/0030635 A1   2/2004   Marigliano
2007/0038549 A1   2/2007   Janowski et al.
2008/0086405 A1   4/2008   Sundaram et al.
2009/0299890 A1   12/2009   Kontos et al.

OTHER PUBLICATIONS

International Search Report including the Written Opinion from International Application No. PCT/US11/51890 mailed Dec. 7, 2011 PCT/ISA/220 (1 page)—PCT/ISA/210 (2 pages)—PCT/ISA/237 (4 pages)—Search History (3 pages).

* cited by examiner

*Primary Examiner* — Richard C Weisberger
(74) *Attorney, Agent, or Firm* — Banner & Witcoff, Ltd.

(57) ABSTRACT

Systems and methods for matching orders are provided. One or more trade templates are created. The trade templates define groups of orders for financial instruments that may be combined such that all of the orders are matched. A collection of tradable price levels is also created for each template. New orders and resting orders are analyzed using one or more trade templates and tradable price levels to determine whether a combination of orders satisfies all of the elements of a trade template with a required price level. When all of the elements of a trade template are satisfied and an order with a tradable price level is received, the corresponding orders may be matched contemporaneously.

22 Claims, 9 Drawing Sheets

SMART TRADE TEMPLATE BASED MATCHING

FIELD OF THE INVENTION

The present invention relates to systems and methods that are utilized in connection with the trading of financial instruments. More particularly, trade templates tradable price levels are created to define groups of orders for financial instruments that may be combined such that all of the orders are matched.

DESCRIPTION OF THE RELATED ART

Traders often desire to trade defined combinations of financial instruments. For example, butterfly and calendar spread products consist of well defined legs. Typically an exchange attempts to match an order for a spread product with another order for the same spread product. Some existing exchanges attempt to match orders for spread products with multiple orders for legs of the spread products. With such systems, every spread product contract is broken down into a collection of legs and an attempt is made to match orders for the legs. Each leg of a spread instrument may in turn be either an outright or a leg of a spread instrument and is matched against an order for the same instrument.

Large exchanges typically list numerous outright and spread instruments. Market liquidity can be limited by segregating orders into numerous order books with limited ability to match combinations of orders.

Therefore, there exists a need in the art for improved systems and methods for matching groups of orders for financial instruments.

SUMMARY OF THE INVENTION

Aspects of the invention overcome at least some of the above problems and limitations by providing systems and methods for matching orders that utilize one or more trade templates. The trade templates define groups of orders for financial instruments that may be combined such that all of the orders' legs are matched and may include price thresholds needed for each order or a component of the template. The orders may include a plurality of orders for spread products, mini-to-big products, and outright products.

Various embodiments of the invention utilize collections of orders needed to complete a trade template. When a new order is received, the order is compared to the collection of needed orders and tradable price levels to determine whether a trade template can be completed. When the trade template can be completed, orders for financial instruments that form the template may be executed contemporaneously.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

DETAILED DESCRIPTION

Figure 1:
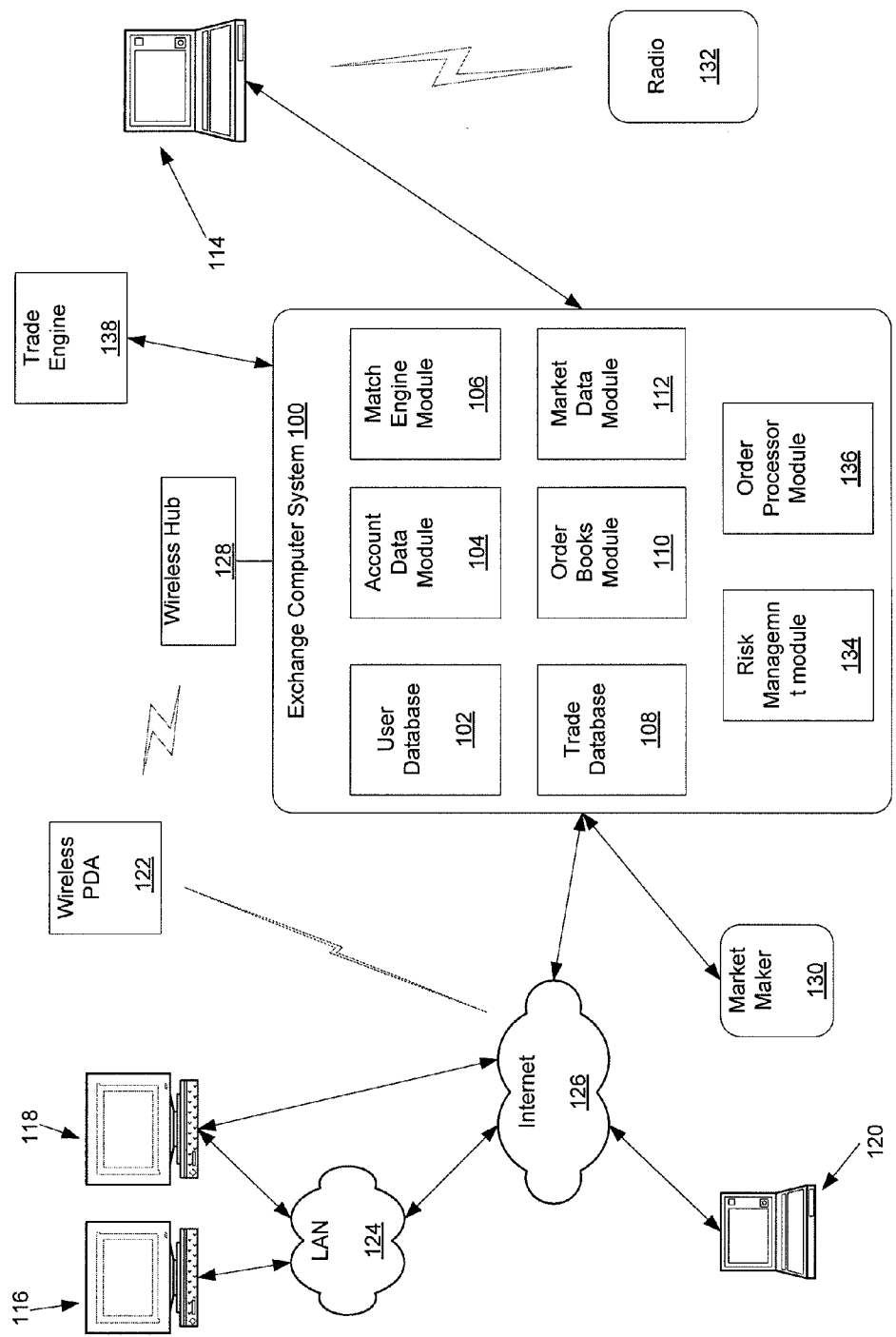
FIG. 1 shows a computer network system that may be used to implement aspects of the invention.

The present invention may take physical form in certain parts and steps, embodiments of which will be described in detail in the following description and illustrated in the accompanying drawings that form a part hereof Exemplary Operating Environment Aspects of the present invention are preferably implemented with computer devices and computer networks that allow users to exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to calculate market data, collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
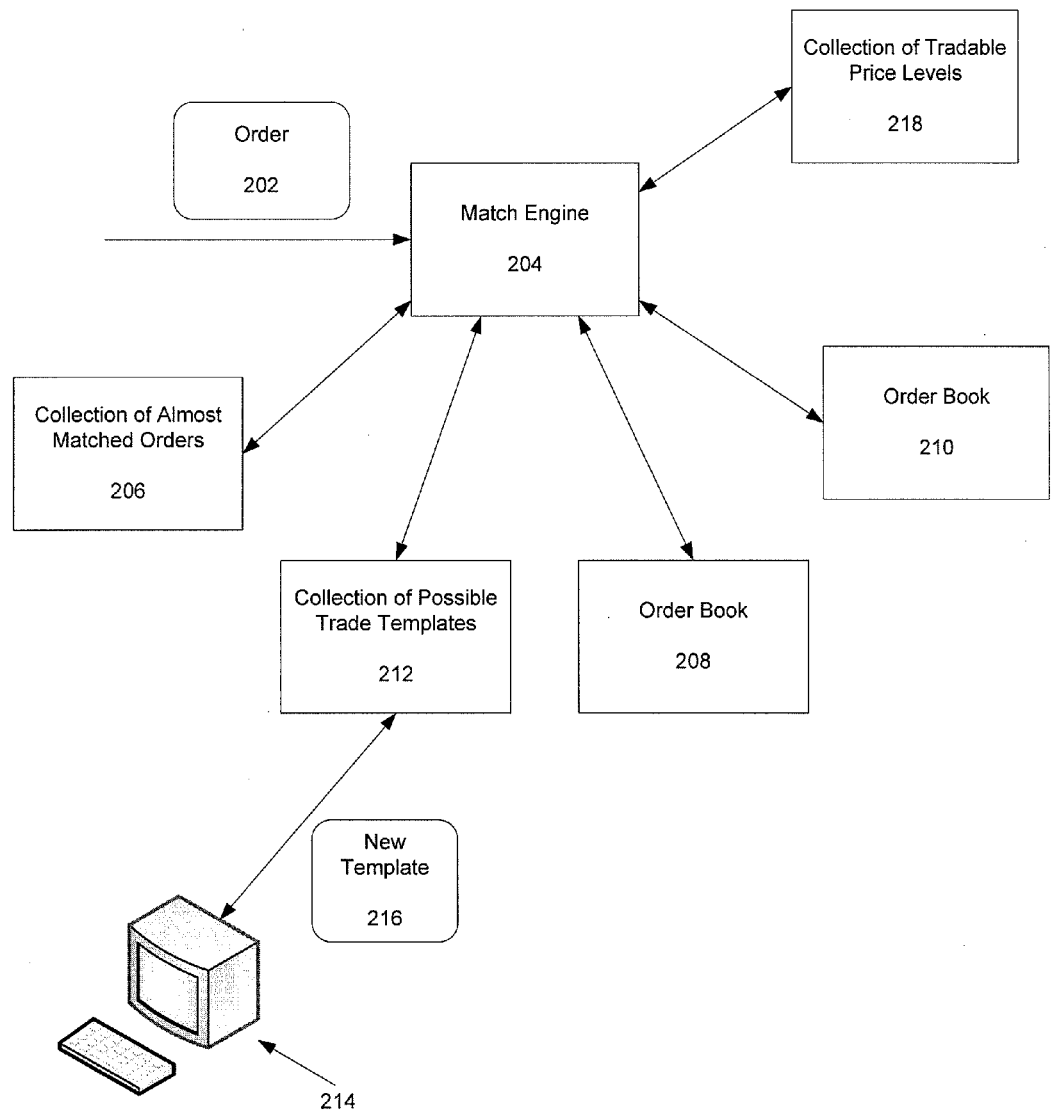
FIG. 2 shows a system that may be used to match orders in accordance with an embodiment of the invention.

FIG. 2 shows a system that may be used to match orders in accordance with an embodiment of the invention. A new order for a financial instrument 202 is received at a match engine 204. Match engine 204 may be similar to match engine module 106 (shown in FIG. 1). As will be described below, match engine 204 attempts to match new order 202 to data included in a collection of almost matched orders 206 and pending orders included in order books 208 and 210. Collection of almost matched orders 206 and/or order books 208 and 210 may be stored in a microprocessor memory. The microprocessor may be used to implement a match engine.

Figure 4:
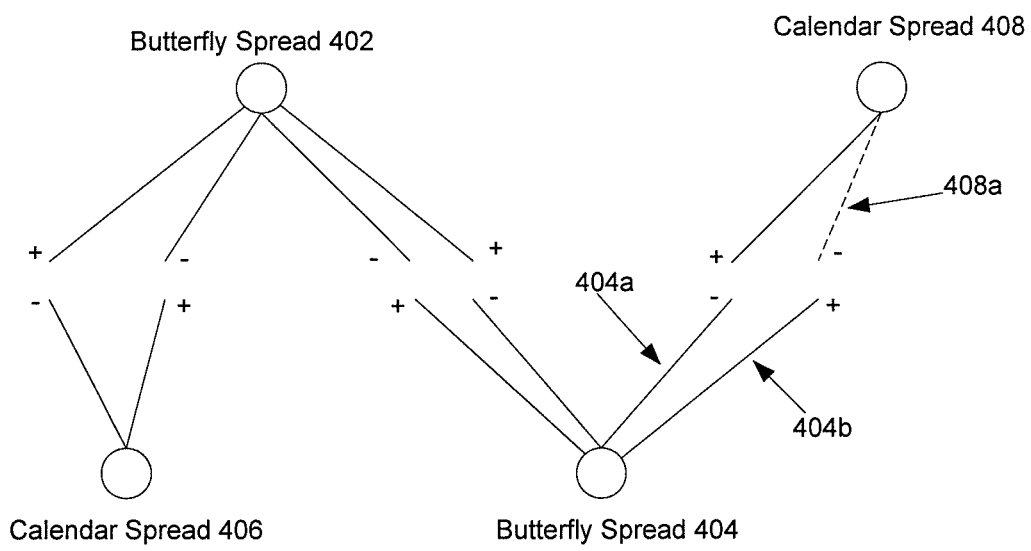
FIG. 4 shows a trade template that consists of trades for two butterfly spreads and two calendar spreads, in accordance with an embodiment of the invention.

Templates for a variety of acceptable trades may be included in a collection of possible trade templates 212. The collection of possible trade templates 212 may identify the structures of a variety of different trades that may involve spread products and other combinations of financial instruments. FIG. 4 shows a template that consists of trades for two butterfly spreads 402 and 404 and two calendar spreads 406 and 408. Orders for spread products 402, 404, 406 and 408 may be received from a variety of combinations of trading entities. For example, a first trader may transmit an order to an exchange for one side of each of spread products 402, 404, 406 and 408. The template may be used to match that order to separate orders for the other sides of spread products 402, 404, 406 and 408. In alternative embodiments, the template may be used to match orders that include orders for individual legs of spread products 402, 404, 406 and 408. Other templates may include combinations of more or fewer financial instruments. Some or all of the financial instruments may be implied financial instruments.

A computer device 214 may be used to add new templates, such as new template 216, to the collection of possible trade templates 212. A plurality of algorithms may be used to create templates and such templates may be added on the fly or during a trading session. In some embodiments computer device may display a graphical user interface to a user that allows the user to create new templates. In other embodiments, described in detail below, computer device 214 may be programmed with computer-executable instructions to analyze instruments and suggest new templates.

A collection of tradable price levels 218 may also be coupled to match engine 204. Tradable price levels may be cached in the context of a needed order for a given template. Tradable price levels are described in detail below. In alternative embodiments various collections may be stored in a processor memory, such as a processor memory of match engine 204.

Figure 3:
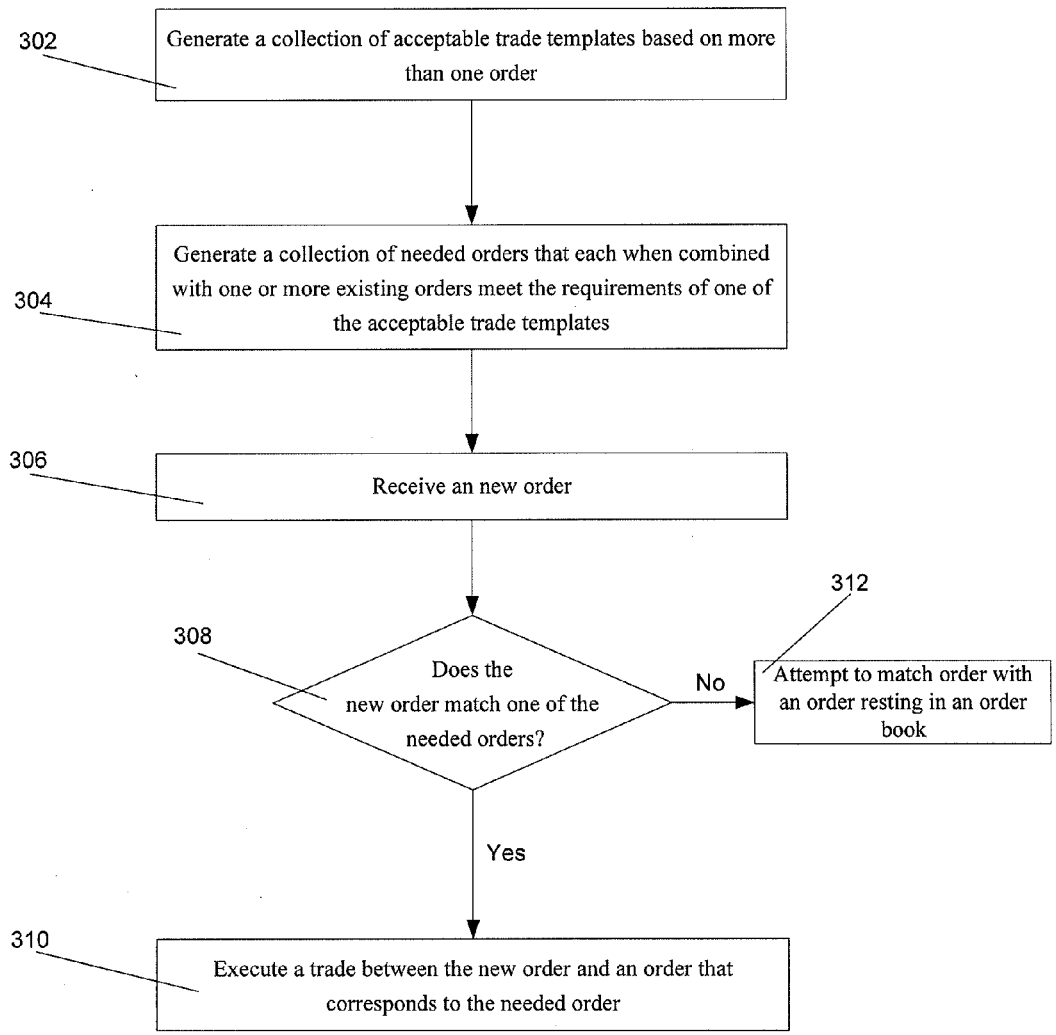
FIG. 3 illustrates a method that may be used to match orders for financial instruments, in accordance with an embodiment of the invention.

FIG. 3 illustrates a method that may be used to match orders for financial instruments, in accordance with an embodiment of the invention. First, in step 302 a collection of acceptable trade templates having more than one order is generated. Some templates may involve a variety of complex and multilevel transactions. Next, in step 304 the collection of needed orders that each when combined with one or more existing orders meets the requirements of one of the acceptable trade templates is generated. FIG. 4 shows a trade template that consists of trades for two butterfly spreads 402 and 404 and two calendar spreads 406 and 408. Leg 408a is shown with a dashed line to represent that at least one order does not currently exist to complete the template. If only one order is needed, that information may be added to collection of almost matched orders 206. Step 304 may include using a computer device to compare existing orders in order books 208 and 210 to the acceptable trade templates.

Next, in step 306 a new order is received. The order may be received at match engine 204. In step 308, it is determined whether the new order matches one of the needed orders. For example, it is determined whether the new order would result in one of the possible trade templates being complete. When the new order does match one of the needed orders, in step 310, a trade between the new order and an order that corresponds to the needed order may be executed. Step 310 may include executing a plurality of trades contemporaneously, such that all of the trades comprising a template are executed before the change in a market. When the new order does not match one of the needed orders, in step 312 an attempt is made to match the order with an order resting in an order book. Step 312 may include utilizing a conventional order match process. Step 312 may also include one or more of the steps shown in FIG. 10 relating price levels, such as steps 1008-1016.

When attempting to match orders, a match engine, such as match engine 204 selects orders having the best price. When a group of orders are combined in accordance with a template and one or more prices are unknown, last trade prices, previous settle prices or a variety of conventional algorithms may be used to determine prices. In one embodiment, an algorithm may use a group of linear equations to derive the price of one leg of a spread product.

Almost matched orders may also be used to create implied instruments. For example, in FIG. 4 if all of the legs of the combination of butterfly spread 402, butterfly spread 404 and calendar spread 406 are matched except for legs 404a and 404b, the result will be an implied calendar spread that may be listed on an exchange with a price needed to complete the template.

Figure 5A:
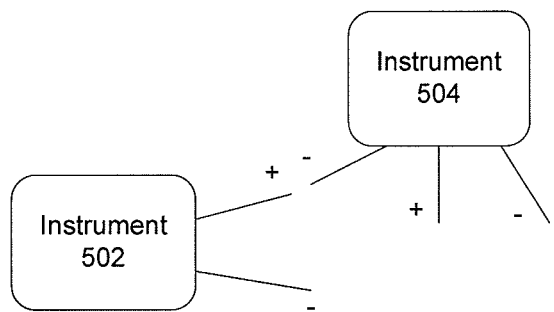
FIGS. 5a, 5b and 5c illustrate a process for matching legs of instruments to create a template, in accordance with an embodiment of the invention.
Figure 5B:
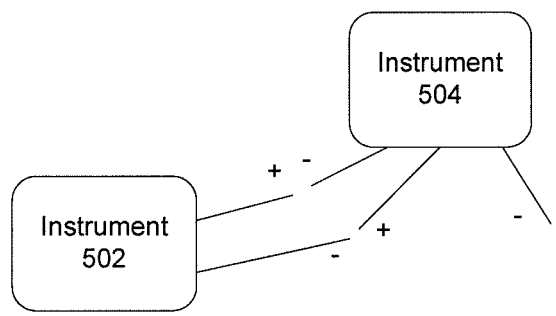

Acceptable trade templates may be created by analyzing individual legs of a group of financial instruments. FIG. 5a, for example, shows a first leg of instrument 502 matched with a first leg of instrument 504. After the first leg of instrument 502 and the first leg of instrument 504 are matched, three legs remain unmatched. In accordance with some embodiments of the invention, some algorithms may give preference to instruments that are already included in the template. For example, FIG. 5b shows a second leg of instrument 504 matched with a second leg of instrument 502. The second leg of instrument 502 is given preference over a similar leg of another instrument to minimize the number of instruments included in a template.

Figure 5C:
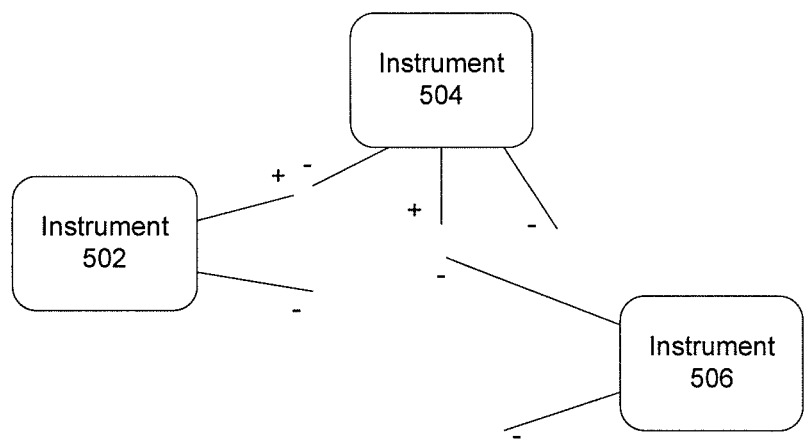

When one of the legs of an instrument does not match a leg and another instrument already included in the template, the legs of other instruments may be analyzed to locate a match. FIG. 5c, for example, shows a second leg of instrument 504 matched with a first leg of instrument 506.

Figure 6:
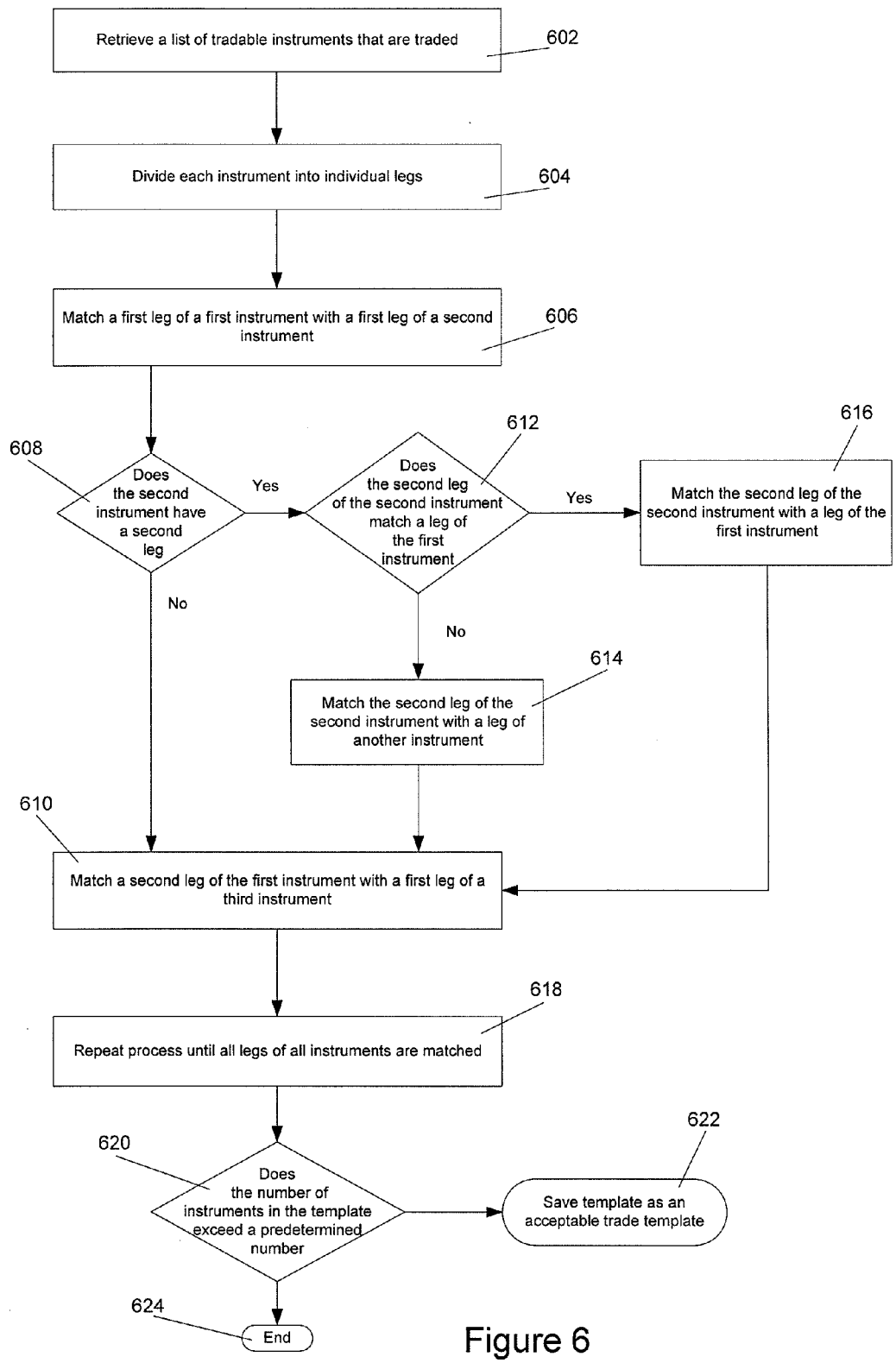
FIG. 6 illustrates an exemplary method of creating acceptable trade templates in accordance with an embodiment of the invention.

FIG. 6 illustrates an exemplary method of creating acceptable trade templates in accordance with an embodiment of the invention. First, in step 602 a list of tradable instruments is retrieved. The list may include all instruments that are tradable at an exchange, a subset of all instruments that are tradable at an exchange or another collection of instruments. In step 604 each instrument is divided into individual legs. For example, butterfly spreads are divided into four legs. Next, in step 606 a first leg of a first instrument is matched with a first leg of a second instrument.

In step 608 it is determined whether the second instrument has a second leg. When the second instrument does not have a second leg, in step 610 a second leg of the first instrument is matched with a first leg of a third of instrument. When the second instrument has a second leg, in step 612 is determined whether the second leg of the second instrument matches a leg of the first instrument. When there is no match, in step 614 the second leg of the second instrument is matched with a leg of another instrument. Of course, if no match can be found, the process ends without the creation of an acceptable trade template. When the second leg of the second instrument matches a leg of the first instrument, in step 616 the second leg of the second instrument is matched with a leg of the first instrument.

In step 616 the process is repeated until all legs of all instruments are matched. Step 616 may include repeating different iterations of steps 606 through 616 until all legs are matched or it is determined that one or more legs cannot be matched.

After a template is created by matching all of the legs of the instruments in the template, in step 618 it is determined whether the number of instruments in the template exceeds a predetermined number. The predetermined number may be a maximum number of instruments that are allowed to comprise an acceptable trade template. When the number of instruments does not exceed the predetermined number, the template is saved as an acceptable trade template in step 622. When the number does exceed the predetermined number the process ends in step 624 and the template is not considered an acceptable trade template.

Figure 7:
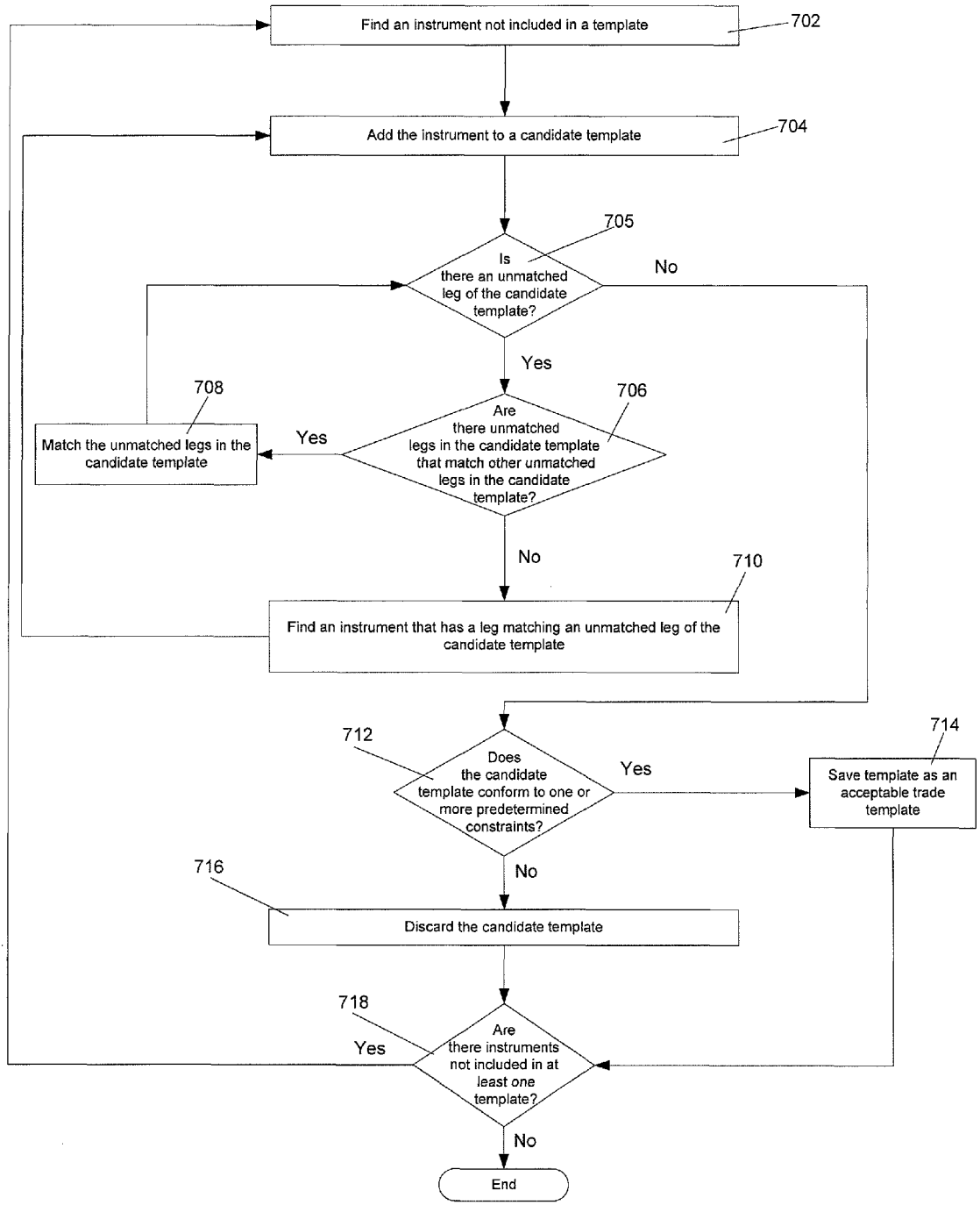
FIG. 7 illustrates an exemplary process that may be used to ensure that all tradable instruments are included in at least one template.

Some match systems that implement aspects of the invention will only attempt to match instruments that are included within templates. In such systems it may be desirable to ensure that all tradable instruments are included in at least one template. FIG. 7 illustrates an exemplary process that may be used to ensure that all tradable instruments are included in at least one template. First, in step 702 the process finds an instrument not included in a template. Step 702 may include reviewing a list of all of the instruments tradable at an exchange and identifying those instruments that are not already included in a template. Next, in step 704 the instrument is added to a candidate template. The candidate template may initially only include the single instrument. Then, it is determined whether there is an unmatched leg of a candidate template in step 705. When there is an unmatched leg, in step 706 it is determined whether there are already unmatched legs in the candidate template that match other unmatched legs in the candidate template. When there are, in step 708 the unmatched legs that are already included in the candidate template are matched and the process returns to step 705 to locate other unmatched legs. When there are not unmatched legs in the candidate template that may be matched, in step 710 the process finds an instrument that has a leg matching an unmatched leg of the candidate template. Set 710 may include locating another instrument tradable at an exchange that has a leg that matches an unmatched leg of the candidate template. After step 710, the process returns to step 704.

Returning to step 705, when there are no longer any unmatched legs in the candidate template, in step 712 is determined whether the candidate template conforms to one or more predetermined constraints. The predetermined constraints may include maximum number of instruments that may be included in a template, limits on combinations of particular instruments and may be included in templates or any other criteria. When the candidate template does conform to the constraints, in step 714 the template is saved as an acceptable trade template. When the candidate template does not conform to the one or more predetermined constraints, in step 716 the candidate template is discarded. Finally, in step 718 it is determined whether there are still instruments that are not included in at least one template. When there are not, the process ends. When there are instruments that are not included in at least one template, the process returns to step 702.

Various embodiments of the invention may calculate minimum trade conditions for acceptable trade templates. For example, when a needed order is identified for an acceptable trade template, a minimum tradable price level for the needed order and/or orders for other financial instruments in the acceptable trade template may be determined.

Figure 8:
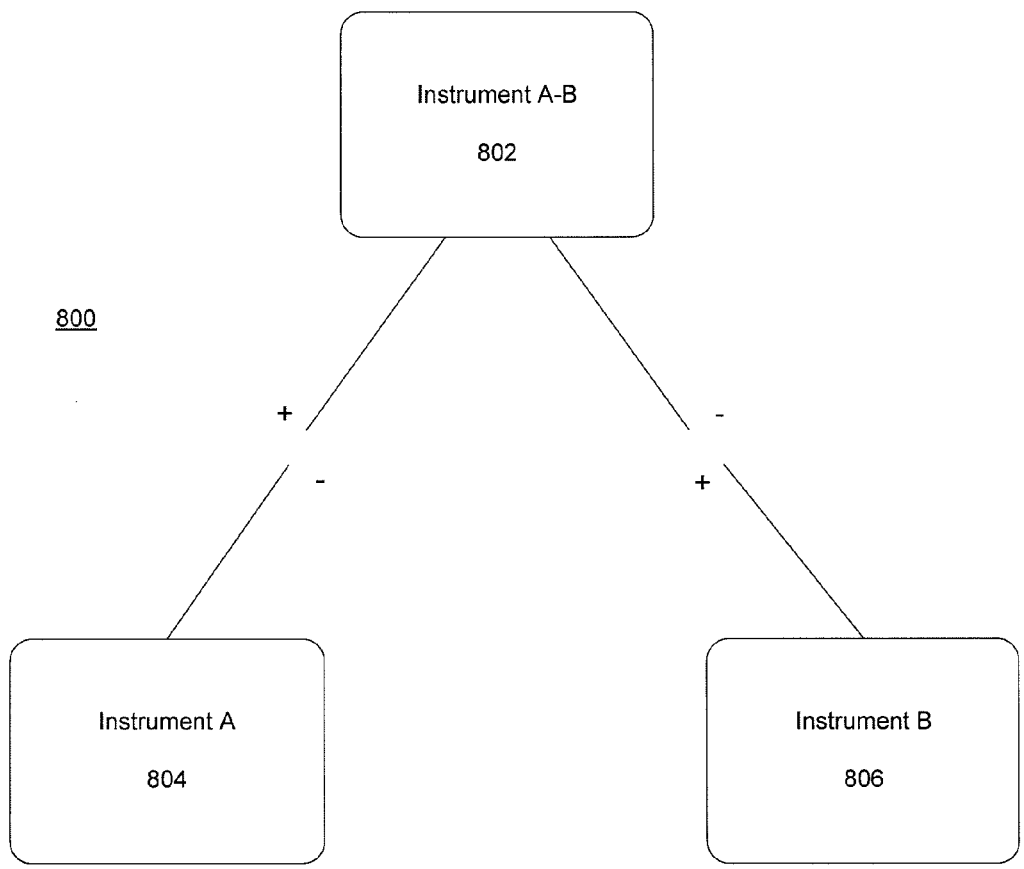
FIG. 8 illustrates an acceptable trade template in accordance with an embodiment of the invention.
Figure 9:
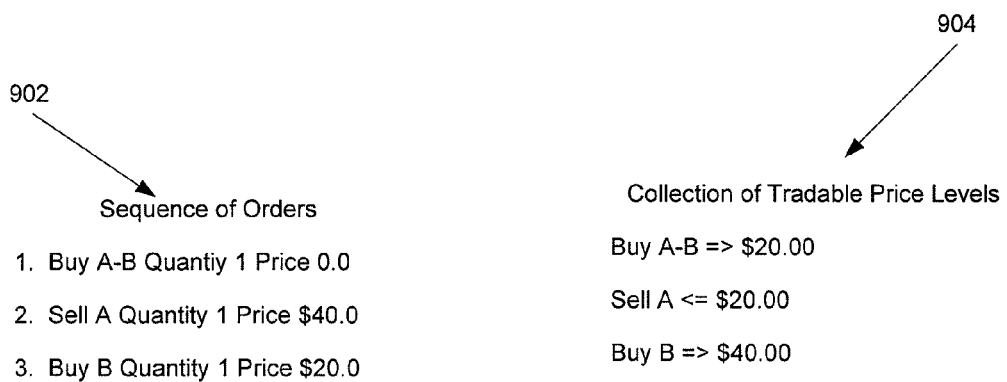
FIG. 9 illustrates an exemplary sequence of unmatched orders and a corresponding collection of tradable price levels for financial instruments that form the trade template shown in FIG. 8.

FIG. 8 illustrates an acceptable trade template 800 in accordance with an embodiment of the invention. Template 800 includes instrument A-B (buy A and sell B) 802, Instrument A 804 and Instrument B 806. FIG. 9, illustrates an exemplary sequence of unmatched orders 902 and a corresponding collection of tradable price levels 904 for financial instruments that form trade template 800. The tradable price level may be a minimum bid price or maximum offer price.

While the sequence of unmatched orders 902 addresses all of the legs of template 800, the prices do not allow for matching of all of the legs. The unmatched orders do allow for the generation of collection of tradable price levels 904. For example, if a buy order for financial instrument A-B is received with a price of at least $20, all of the financial instruments in template 800 may be matched. Similarly, tradable price levels for other financial instruments that form template 800 may also be generated and are shown in FIG. 9. Tradable price levels may be calculated the first time a needed order is received or at other times.

Generating a collection of tradable price levels allows for reduced processing when new orders arrive. Instead of analyzing the prices of all of the financial instruments that form a template, the price of the new order need only be compared to the appropriate tradable price level. Of course, when a new order arrives, the price may be compared to tradable price levels for multiple or numerous templates.

A new order may also result in a change to the collection of tradable price levels. In the example shown in FIGS. 8 and 9, assume that a new buy order for financial instrument B at a price of $30 is received. Since $30 is less than $40 listed in collection of tradable price levels 904, the legs of template 800 would not be matched. However, the $30 price is better than the $20 price listed in sequence of orders 902, so the collection of tradable price levels may be readjusted. The new price level would result in collection of tradable price levels 904 including buy A-B=>$10.00; sell A<=$30 and buy B=>$40. As mentioned above, tradable price levels for other templates may also be modified. Tradable price levels may also be distributed as market data.

Figure 10:
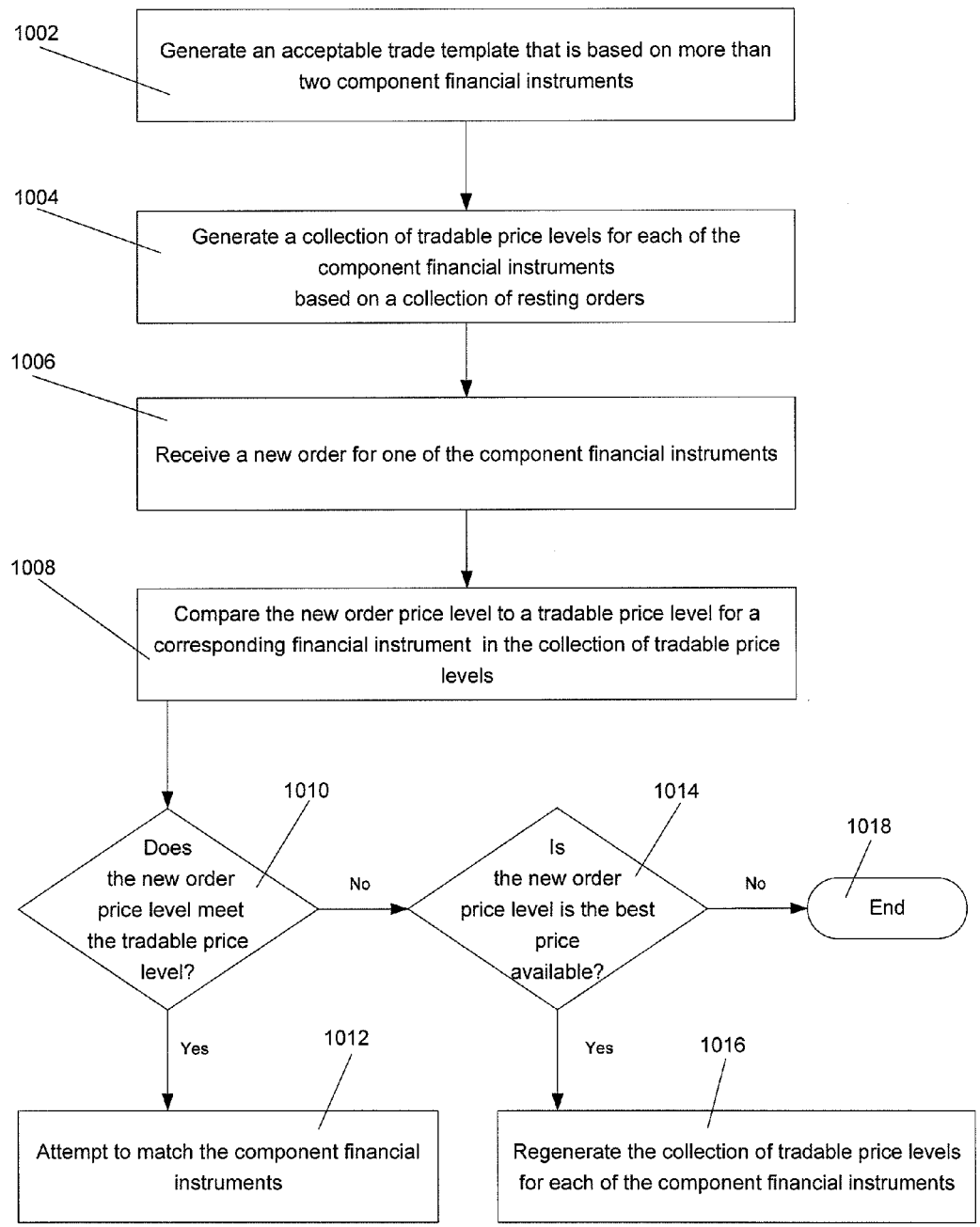
FIG. 10 illustrates a method of matching orders for financial instruments that utilizes a collection of tradable price levels, in accordance with an embodiment of the invention.

FIG. 10 illustrates a method of matching orders for financial instruments that utilizes a collection of tradable price levels, in accordance with an embodiment of the invention. First in step 1002 an acceptable trade template that is based on more than two component financial instruments is generated. Of course, multiple acceptable trade templates may be created in step 1002. Next, in step 1004 a collection of tradable price levels for each of the component financial instruments is generated. The tradable price levels may be based on a collection of resting orders in the manner described above. For example, a tradable price level may be the minimum bid price or maximum offer price for a financial instrument to complete one of acceptable trade templates. The tradable price levels may be stored as metadata for corresponding trade templates. Other metadata, such as currency types, may also be included.

A new order is received in step 1006. The new order is for one of the component financial instruments and has a new order price level. Next, the new order price level may be compared to a tradable price level for a corresponding financial instrument in the collection of tradable price levels in step 1008. Step 1008, as well several or all of the remaining steps shown in FIG. 10, may be performed at a processor. When the new order price level meets the tradable price level in step 1010, in step 1012 an attempt is made to match the component financial instruments. Step 1012 may include executing a plurality of trades contemporaneously, such that all of the orders comprising a template are executed before a change in a market. When the new order price level does not meet the tradable price level in step 1010, in step 1014 it is determined whether the new order price level is the best price available. The new order price level may be the best price available when it is better than the prices of other resting orders. When the new order price level is the best price available, in step 1016 the collection of tradable price levels is generated for each of the component financial instruments based on the collection of resting orders and the new order.

Of course, various embodiments disclosed above may be used together. For example, the processes and portions of the processes shown in FIGS. 6, 7 and 10 may be combined to create and use collections of acceptable trade templates and collections of tradable price levels.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

The invention claimed is:

1. A method of matching orders for financial instruments, the method comprising:
    (a) generating at a processor an acceptable trade template that is based on more than two component financial instruments;
    (b) generating at a processor a collection of tradable price levels for each of the component financial instruments of the acceptable trade template based on a collection of resting orders;
    (c) receiving a new order for one of the component financial instruments, the new order having a new order price level;
    (d) comparing at a processor the new order price level to a tradable price level for a corresponding financial instrument in the collection of tradable price levels; and
    (e) when the new order price level meets the tradable price level, attempting to match the component financial instruments at a processor.

2. The method of claim 1, further including:
    when the new order price level does not meet the tradable price level, determining if the new order price level is the best price available; and
    regenerating the collection of tradable price levels for each of the component financial instruments based on the collection of resting orders, trade templates, and the new order.

3. The method of claim 1, wherein the collection of tradable price levels is stored in a processor memory.

4. The method of claim 1, wherein at least one of the component financial instruments comprise a spread product.

5. The method of claim 4, wherein the spread product comprises an implied spread product.

6. The method of claim 4, wherein the spread product comprises a butterfly spread product.

7. The method of claim 4, wherein the spread product comprises a crack spread product.

8. The method of claim 1, wherein at least two of the component financial instruments comprise spread products.

9. The method of claim 1, wherein (a) comprises using more than one algorithm to generate the acceptable trade template.

10. The method of claim 1, wherein (e) comprises attempting to match the component financial instruments contemporaneously.

11. A system that matches orders for financial instruments, the system comprising:
    a collection of acceptable trade templates each based on more than two component financial instruments;
    a collection of needed orders that each when combined with one or more existing orders meet the requirements of one of the acceptable trade templates;
    a collection of tradable price levels for each one of the needed orders that are part of an acceptable trade template;
    a match engine programmed with computer-executable instructions to:
        compare a new order to the needed orders in the collection of needed orders;
        when the new order corresponds to one of the needed orders, compare a price level of the new order to a price level in the collection of tradable price levels; and
        when the new order corresponds to one of the needed orders and the new order price level meets a corresponding tradable price level, attempting to match the component financial instruments of a trade template.

12. The system of claim 11, wherein the match engine comprises a microprocessor having a memory.

13. The system of claim 12, wherein the collection of needed orders is stored in the microprocessor memory.

14. The system of claim 12, wherein the collection of tradable price levels is stored in the microprocessor memory.

15. The system of claim 11, further including a plurality of order books connected to the match engine.

16. The system of claim 15, further including a computer device programmed with computer-executable instructions to analyze orders resting in a plurality of order books and suggest new templates that would result in the matching of groups of orders.

17. The system of claim 11, wherein the match engine is further programmed with computer-executable instructions to perform the steps comprising:
    when the new order price level does not meet a price level in the collection of tradable price levels, determining if the new order price level is the best price available; and
    regenerating the collection of tradable price levels for each of the component financial instruments of at least one trade template based on the collection of resting orders and the new order.

18. A tangible computer-readable medium containing computer-executable instructions for causing a match system to perform the steps comprising:
    (a) generating an acceptable trade template that is based on more than two component financial instruments;
    (b) generating a collection of tradable price levels for each of the component financial instruments of the acceptable trade template based on a collection of resting orders;
    (c) receiving a new order for one of the component financial instruments, the new order having a new order price level;
    (d) comparing the new order price level to a tradable price level for a corresponding financial instrument in the collection of tradable price levels; and
    (e) when the new order price level meets the tradable price level, attempting to match the component financial instruments.

19. The computer-readable medium of claim 18, wherein the trade template includes at least one spread product.

20. The computer-readable medium of claim 19, wherein the at least one spread product comprises an implied spread product.

21. The computer-readable medium of claim 18, wherein the at least one spread product comprises a butterfly spread product.

22. The computer-readable medium of claim 18, further including:
    (f) when the new order price level does not meet the tradable price level, regenerating the minimum needed tradable price levels for the components in the trade template.

* * * * *